US012126079B2

(12) United States Patent
Wu et al.

(10) Patent No.: US 12,126,079 B2
(45) Date of Patent: Oct. 22, 2024

(54) ANTENNA AND MANUFACTURING METHOD THEREOF

(71) Applicant: BOE TECHNOLOGY GROUP CO., LTD., Beijing (CN)

(72) Inventors: Qianhong Wu, Beijing (CN); Dongdong Zhang, Beijing (CN); Hai Yu, Beijing (CN); Yafei Zhang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 333 days.

(21) Appl. No.: 17/638,953

(22) PCT Filed: Mar. 15, 2021

(86) PCT No.: PCT/CN2021/080751
§ 371 (c)(1),
(2) Date: Feb. 28, 2022

(87) PCT Pub. No.: WO2022/193057
PCT Pub. Date: Sep. 22, 2022

(65) Prior Publication Data
US 2023/0163478 A1 May 25, 2023

(51) Int. Cl.
*H01Q 13/10* (2006.01)
*H01Q 1/42* (2006.01)

(52) U.S. Cl.
CPC ........... *H01Q 13/106* (2013.01); *H01Q 1/422* (2013.01)

(58) Field of Classification Search
CPC ........ H01Q 1/38; H01Q 9/0407; H01Q 9/285; H01Q 21/065; H01Q 21/24; H01Q 13/106
See application file for complete search history.

(56) References Cited

U.S. PATENT DOCUMENTS 4,719,470 A * 1/1988 Munson ................. H01Q 9/065 343/834
6,057,802 A * 5/2000 Nealy .................... H01Q 9/045 343/873
(Continued)

FOREIGN PATENT DOCUMENTS

CN 103346396 A * 10/2013
CN 107039761 A * 8/2017
(Continued)

OTHER PUBLICATIONS

European Patent Office, EESR dated May 8, 2023, for corresponding EP application 21930654.5.
(Continued)

*Primary Examiner* — Seokjin Kim
(74) *Attorney, Agent, or Firm* — HOUTTEMAN LAW LLC

(57) ABSTRACT

An antenna includes: a dielectric layer; a reference electrode layer on a first surface of the dielectric layer and with a slot therein; radiation structure on a second surface of the dielectric layer. The radiation structure includes a plurality of radiation parts spaced apart from each other, each of which includes radiation elements spaced apart from each other. The plurality of radiation parts in each radiation structure include first radiation part and a second radiation part; and a first microstrip line and a second microstrip line are on the second surface. The first microstrip line is configured to feed power to the radiation elements in the first radiation part, and the second microstrip line is configured to feed power to the radiation elements in the second radiation part. The first microstrip line has a feed direction different from that of the second microstrip line.

20 Claims, 8 Drawing Sheets

(56) References Cited

U.S. PATENT DOCUMENTS

| | | | | | |
|---|---|---|---|---|---|
| 6,144,344 | A * | 11/2000 | Kim | H01Q 21/10 343/789 |
| 8,830,133 | B2 * | 9/2014 | Weily | H01Q 21/24 343/770 |
| 11,888,218 | B2 * | 1/2024 | Abiri | H01Q 19/021 |
| 2009/0073047 | A1 * | 3/2009 | Le Bolzer | H01Q 1/521 343/700 MS |
| 2011/0090129 | A1 * | 4/2011 | Weily | H01Q 21/24 343/770 |
| 2013/0044035 | A1 * | 2/2013 | Zhuang | H01Q 9/0428 343/770 |
| 2013/0314284 | A1 | 11/2013 | Tasaki et al. | |
| 2021/0021051 | A1 * | 1/2021 | Chen | H01Q 13/106 |
| 2022/0209402 | A1 * | 6/2022 | Yokokawa | H01Q 21/065 |
| 2023/0163478 | A1 * | 5/2023 | Wu | H01Q 21/24 343/702 |

FOREIGN PATENT DOCUMENTS

| | | | | |
|---|---|---|---|---|
| CN | 107732443 | A | 2/2018 | |
| CN | 207134482 | A | 3/2018 | |
| CN | 109088165 | A | 12/2018 | |
| CN | 110768005 | A | 2/2020 | |
| CN | 110808448 | A | 2/2020 | |
| EP | 3512037 | A1 * | 7/2019 | |
| EP | 3859888 | A1 * | 8/2021 | H01Q 1/38 |
| EP | 3365942 | B1 * | 2/2024 | G01R 29/10 |
| WO | WO-2009097647 | A1 * | 8/2009 | H01Q 1/38 |
| WO | WO2017055835 | A1 | 4/2017 | |

OTHER PUBLICATIONS

Bagheroghli et al., "Double triangular monopole-like antenna with reconfigurable singledual-wideband circular polarization," Internat. J. Microwave Computer-Aided Eng., Feb. 2018, pp. 1-9, vol. 28, No. 5, Wiley Interscience, Hoboken, N.J. USA.

Research on Dual-Polarized Microstrip Antenna Arrays dated Jun. 2006.

Korkontzila et al., "Dual frequency microstrip patch antenna, reduced in size by use of triangularly arranged peripheral slits," Proc. EuCAP Oct. 2006.

* cited by examiner

ANTENNA AND MANUFACTURING METHOD THEREOF

CROSS-REFERENCE TO RELATED APPLICATIONS

This is a National Phase Application filed under 35 U.S.C. 371 as a national stage of PCT/CN2021/080751 filed on Mar. 15, 2021, the content of which is incorporated herein by reference in its entirety.

TECHNICAL FIELD

The present disclosure belongs to the field of communication technology, and specifically relates to an antenna and a manufacturing method thereof.

BACKGROUND

Compared with the 4th generation mobile communication technology (4G), the 5th generation mobile communication technology (5G) has the advantages of higher data rate, larger network capacity, less time delay, and the like. The 5G frequency plan includes two parts, namely a low-frequency band and a high-frequency band. The low-frequency band (3-6 GHz) has good propagation characteristics and very abundant spectrum resources. Therefore, the development of antenna units and arrays for communication applications using the low-frequency band has gradually become a hotspot in the research and development at the current stage.

Based on the practical application scenarios of 5G mobile communications, a 5G low-frequency band antenna (i.e., a 5G antenna using the low-frequency band) should have technical features such as high gain, miniaturization, and broad band. A microstrip antenna is a commonly used antenna form which has a simple structure, is easy to array and can realize a relatively high gain. However, application of the microstrip antenna in 5G low-frequency mobile communication is limited by the narrow bandwidth of the microstrip antenna and the large antenna size of the microstrip antenna at the low-frequency band.

SUMMARY

Embodiments of the present disclosure provide an antenna and a manufacturing method thereof.

In a first aspect, an embodiment of the present disclosure provides an antenna, including:

a dielectric layer with a first surface and a second surface disposed opposite to each other;

a reference electrode layer disposed on the first surface of the dielectric layer and provided with at least one slot therein;

at least one radiation structure disposed on the second surface of the dielectric layer, with an orthogonal projection of one radiation structure on the dielectric layer located in an orthogonal projection of one slot on the dielectric layer; wherein each radiation structure includes a plurality of radiation parts spaced apart from each other, each of which includes radiation elements spaced apart from each other; and the plurality of radiation parts in each radiation structure include at least a first radiation part and a second radiation part; and at least one first microstrip line and at least one second microstrip line disposed on the second surface of the dielectric layer; wherein one first microstrip line is configured to feed power to the radiation elements in one first radiation part, one second microstrip line is configured to feed power to the radiation elements in one second radiation part, and the first microstrip line has a feed direction different from that of the second microstrip line.

The feed direction of one of the first microstrip line and the second microstrip line is a vertical direction and the feed direction of the other of the first microstrip line and the second microstrip line is a horizontal direction.

The first radiation part and the second radiation part each include two radiation elements spaced apart from each other; the first microstrip line and the second microstrip line each include one connection part and two branch parts connected with the connection part; the two branch parts of the first microstrip line are respectively connected to the two radiation elements in the first radiation part; and the two branch parts of the second microstrip line are respectively connected to the two radiation elements in the second radiation part.

Orthogonal projections of the first microstrip line and the second microstrip line on the dielectric layer each at least partially overlap an orthogonal projection of the slot on the dielectric layer; and orthogonal projections of the two branch parts of the first microstrip line and the two branch parts of the second microstrip line on the dielectric layer are each located in the orthogonal projection of the slot on the dielectric layer.

The plurality of radiation parts in the radiation structure further include: a third radiation part and a fourth radiation part; wherein the third radiation part is disposed opposite to the first radiation part, and the fourth radiation part is disposed opposite to the second radiation part.

Each radiation element has a triangular plate-shaped structure, the first, second, third and fourth radiation parts each include two radiation elements spaced apart from each other, and the radiation elements in the radiation structure form a double-cross shaped opening.

The radiation structure has a rectangular contour, and the slot is rectangular.

In each radiation structure, a distance between the radiation parts is greater than a distance between the radiation elements.

The antenna further includes a first feed structure and a second feed structure, wherein the first feed structure and the second feed structure are each located on the second surface of the dielectric layer, an orthogonal projection of the first feed structure on the dielectric layer overlaps at least partially an orthogonal projection of the first microstrip line on the dielectric layer, and an orthogonal projection of the second feed structure on the dielectric layer overlaps at least partially an orthogonal projection of the second microstrip line on the dielectric layer.

The first feed structure is electrically connected to the first microstrip line; and the second feed structure is electrically connected to the second microstrip line.

The number of the at least one slot is $2^n$, the first feed structure includes n levels of third microstrip lines, and the second feed structure includes n levels of fourth microstrip lines;

one 1st level third microstrip line is connected to two adjacent first microstrip lines, and different 1st level third microstrip lines are respectively connected to different first microstrip lines; and one $m^{th}$ level third microstrip line is connected to two adjacent $(m-1)^{th}$ level third microstrip lines, and different $m^{th}$ level third microstrip lines are respectively connected to different $(m-1)^{th}$ level third microstrip lines; and one 1st level fourth microstrip line is connected to two adjacent second microstrip lines, and different 1st level fourth microstrip lines are respectively connected to different second microstrip lines; and one $m^{th}$ level fourth microstrip line is connected to two adjacent $(m-1)^{th}$ level fourth microstrip lines, and different $m^{th}$ level fourth microstrip lines are respectively connected to different $(m-1)^{th}$ level fourth microstrip lines; where $n \geq 2$, $2 \leq m \leq n$, and m and n are both integers.

The reference electrode layer includes a body part, a first branch and a second branch; the first branch and the second branch are respectively connected to two sides of the body part in a lengthwise direction of the body part; the antenna further includes a fifth microstrip line and a sixth microstrip line; the fifth microstrip line is connected to the first feed structure, and an orthogonal projection of the fifth microstrip line on the dielectric layer is located in an orthogonal projection of the first branch on the dielectric layer; the sixth microstrip line is connected to the second feed structure, and an orthogonal projection of the sixth microstrip line on the dielectric layer is located in an orthogonal projection of the second branch on the dielectric layer; and a perpendicular bisector of a width of the body part coincides with one diagonal line of the dielectric layer; and an extending direction of the fifth microstrip line is perpendicular to an extending direction of the sixth microstrip line, and an angle between the extending direction of each of the fifth and sixth microstrip lines and the diagonal line of the dielectric layer is 45°.

The antenna includes feed regions and a radiation region; the first feed structure and the second feed structure are respectively located in the feed region; the radiation structure is located in the radiation region; the reference electrode layer further includes at least one auxiliary slot located in each of the feed regions; and an orthogonal projection of the auxiliary slot on the dielectric layer does not overlap orthogonal projections of the first feed structure and the second feed structure on the dielectric layer.

The dielectric layer includes a first sub-dielectric layer, a first bonding layer, a second sub-dielectric layer, a second bonding layer, and a third sub-dielectric layer disposed in a stack, wherein a surface of the first sub-dielectric layer distal to the first bonding layer serves as the first surface of the dielectric layer, and a surface of the third sub-dielectric layer distal to the second bonding layer serves as the second surface of the dielectric layer.

The dielectric layer includes a first sub-dielectric layer, a first bonding layer, a second sub-dielectric layer, a second bonding layer, and a third sub-dielectric layer disposed in a stack, wherein a surface of the first sub-dielectric layer proximal to the first bonding layer serves as the first surface of the dielectric layer, and a surface of the third sub-dielectric layer proximal to the second bonding layer serves as the second surface of the dielectric layer.

The first sub-dielectric layer and the third sub-dielectric layer each include polyimide; and the second sub-dielectric layer includes polyethylene glycol terephthalate.

The dielectric layer includes a first sub-dielectric layer, a first bonding layer and a second sub-dielectric layer disposed in a stack, wherein a surface of the first sub-dielectric layer distal to the first bonding layer serves as the first surface of the dielectric layer, and a surface of the second sub-dielectric layer distal to the first bonding layer serves as the second surface of the dielectric layer; and the first sub-dielectric layer includes a material of polyimide, and the second sub-dielectric layer includes a material of polyethylene glycol terephthalate, or the first sub-dielectric layer includes a material of polyethylene glycol terephthalate, and the second sub-dielectric layer includes a material of polyimide.

The dielectric layer has a single-layer structure and includes a material of polyimide or polyethylene glycol terephthalate.

The at least one slot includes a plurality of slots arranged side by side, with a constant distance between adjacent slots.

In a second aspect, an embodiment of the present disclosure provides a method for manufacturing an antenna, including:

providing a dielectric layer;

forming a pattern including a reference electrode layer on a first surface of the dielectric layer through a patterning process; wherein a slot is formed in the reference electrode layer; and forming a pattern including at least one radiation structure, at least one first microstrip line and at least one second microstrip line on a second surface of the dielectric layer through a patterning process; wherein an orthogonal projection of one radiation structure on the dielectric layer is located in an orthogonal projection of the slot on the dielectric layer; the radiation structure includes a plurality of radiation parts spaced apart from each other, each of which includes radiation elements spaced apart from each other; and the plurality of radiation parts in each radiation structure include at least a first radiation part and a second radiation part; one first microstrip line is configured to feed power to the radiation elements in one first radiation part, one second microstrip line is configured to feed power to the radiation elements in one second radiation part, and the first microstrip line has a feed direction different from that of the second microstrip line.

The dielectric layer includes a first sub-dielectric layer, a first bonding layer, a second sub-dielectric layer, a second bonding layer, and a third sub-dielectric layer sequentially disposed in a stack, wherein the reference electrode layer is formed on a side of the first sub-dielectric layer distal to the first bonding layer; and the radiation structure is formed on a side of the third sub-dielectric layer distal to the second bonding layer.

The dielectric layer includes a first sub-dielectric layer, a first bonding layer, a second sub-dielectric layer, a second bonding layer, and a third sub-dielectric layer sequentially disposed in a stack, wherein the reference electrode layer is formed on a side of the first sub-dielectric layer proximal to the first bonding layer; and the radiation structure is formed on a side of the third sub-dielectric layer proximal to the second bonding layer.

DETAIL DESCRIPTION OF EMBODIMENTS

To improve understanding of the technical solution of the present disclosure for one of ordinary skill in the art, the present disclosure will now be described in detail with reference to accompanying drawings and specific embodiments.

Unless otherwise defined, technical or scientific terms used in the present disclosure are intended to have general meanings as understood by one of ordinary skill in the art. The words "first", "second" and similar terms used in the present disclosure do not denote any order, quantity, or importance, but are used merely for distinguishing different components. Also, the use of the terms "a", "an", "the" of a similar referent does not denote a limitation of quantity, but rather denotes the presence of at least one. The word "comprising", "including" or the like means that the element or item preceding the word contains elements or items that appear after the word or equivalents thereof, but does not exclude other elements or items. The term "connected", "coupled" or the like is not restricted to physical or mechanical connections, but may include electrical connections, whether direct or indirect connections. The words "upper", "lower", "left", "right", and the like are merely used to indicate a relative positional relationship, and when an absolute position of the described object is changed, the relative positional relationship may also be changed accordingly.

It should be noted that S11 mentioned herein refers to one of the S parameters that represents return loss characteristics (i.e., represents a return loss), and the dB value and impedance characteristics of the loss thereof are generally tested by a network analyzer. The parameter S11 represents a performance of the emission efficiency of an antenna, and the larger the value is, the more energy is reflected from the antenna itself, and the worse the efficiency of the antenna is.

Figure 1:
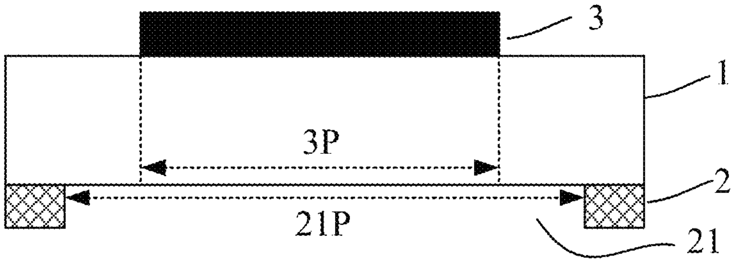
FIG. 1 is a cross-sectional view of an antenna according to an embodiment of the present disclosure.
Figure 2:
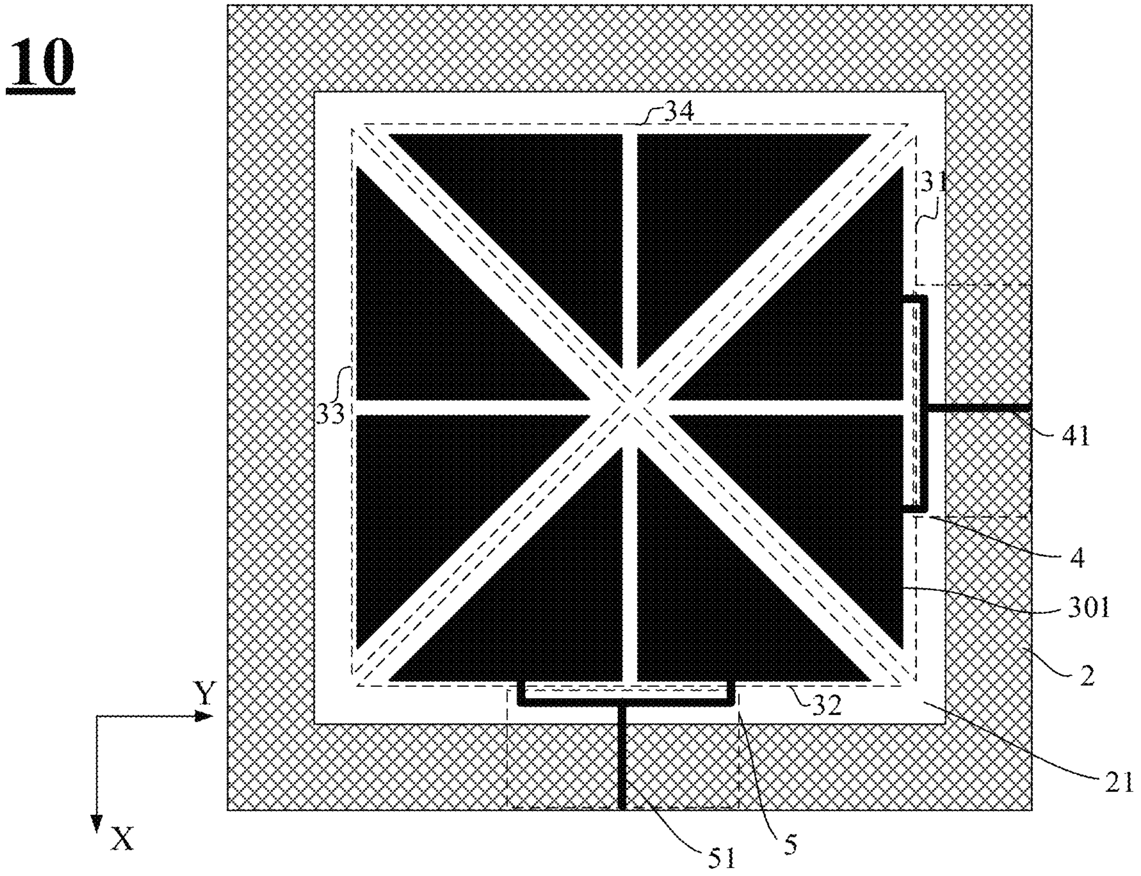
FIG. 2 is a top view of an antenna according to an embodiment of the present disclosure.

In a first aspect, an embodiment of the present disclosure provides an antenna. FIG. 1 is a cross-sectional view of an antenna according to an embodiment of the present disclosure; and FIG. 2 is a top view of an antenna according to an embodiment of the present disclosure. As shown in FIGS. 1 and 2, the antenna includes a dielectric layer 1, a reference electrode layer 2, at least one radiation structure 3, at least one first microstrip line 4 and at least one second microstrip line 5.

The dielectric layer 1 has a first surface (lower surface) and a second surface (upper surface) disposed oppositely.

The reference electrode layer 2 is disposed on the first surface of the dielectric layer 1 and provided with at least one slot 21 therein. The at least one radiation structure 3 is disposed on the second surface of the dielectric layer 1, with an orthogonal projection 3P of one radiation structure 3 on the dielectric layer 1 located in an orthogonal projection 21P of one slot 21 of the reference electrode layer 2 on the dielectric layer 1. For example: when a plurality of radiation structures 3 are provided, a plurality of slots 21 are provided on the corresponding reference electrode layer 2, and the plurality of radiation structures 3 are disposed to be in one-to-one correspondence with the plurality of slots 21. It should be noted here that in the embodiment of the present disclosure, the reference electrode layer 2 may be a ground electrode layer, which means that a ground potential is written into the reference electrode layer 2.

The radiation structure 3 includes a plurality of radiation parts spaced apart from each other, each of which includes radiation elements 301 spaced apart from each other. For example: the radiation parts in each radiation structure 3 include at least a first radiation part 31 and a second radiation part 32; and in this case, the first radiation part 31 and the second radiation part 32 each include radiation elements 301 spaced apart from each other. It should be noted that, in the embodiment of the present disclosure, the description is made by taking the case where two radiation elements 301 spaced apart from each other are included in each radiation part as an example, but it will be appreciated that the number of radiation parts in each radiation part is not limited to two, and may be specifically set according to the performance requirement of the antenna.

The at least one first microstrip line 4 and the at least one second microstrip line 5 are each disposed on the second surface of the dielectric layer 1. One first microstrip line 4 is configured to feed power to the two radiation elements 301 in one first radiation part 31, one second microstrip line 5 is configured to feed power to the two radiation elements 301 in one second radiation part 32, and the first microstrip line 4 has a feed direction different from that of the second microstrip line 5.

For example: when a plurality of radiation structures 3 are provided, correspondingly, a plurality of first radiation parts 31 and a plurality of second radiation parts 32 are provided. In this case, first microstrip lines 4 may be disposed in one-to-one correspondence with the first radiation parts 31, and second microstrip lines 5 may be disposed in one-to-one correspondence with the second radiation parts 32. In some examples, one of each first microstrip line 4 and each second microstrip line 5 has a feed direction being a vertical direction Y, and the other has a feed direction being a horizontal direction X. It should be noted that the feed direction of each first microstrip line 4 is a direction in which an input of a first microwave signal is excited and fed into the first radiation part 31; and the feed direction of each second microstrip line is a direction in which an input of a second microwave signal is excited and fed into the second radiation part 32; and the horizontal direction X and the vertical direction Y are relative concepts, which means that when the feed direction of each first microstrip line 4 is the vertical direction Y, the feed direction of each second microstrip line 5 is the horizontal direction X, and vice versa. In an embodiment of the present disclosure the illustration is made by taking the example where the first microstrip line 4 is connected to a right side of the radiation structure 3, and has the feed direction being the vertical direction Y, and the second microstrip line 5 is connected to a lower side of the radiation structure 3, and has the feed direction being the horizontal direction X.

In the antenna provided in the embodiment of the present disclosure, the first radiation part 31 and the second radiation part 32 of the radiation structure 3 each include two radiation elements 301 spaced apart from each other. The two radiation elements 301 in the first radiation part 31 are connected to one first microstrip line 4, and the two radiation elements 301 in the second radiation part 32 are connected to one second microstrip line 5. That is, each radiation part, which is divided into two elements, is fed by one feed line, thereby expanding the bandwidth thereof and improving the gain of the antenna. Meanwhile, the feed direction of the first microstrip line 4 is the vertical direction Y, which realizes horizontal polarization of the antenna, and the feed direction of the second microstrip line 5 is the horizontal direction X, which realizes vertical polarization of the antenna. In other words, the antenna in the embodiment of the present disclosure is a dual-polarization antenna.

In some examples, as shown in FIG. 1, the dielectric layer 1 in the antenna includes, but is not limited to, a flexible material, such as: polyimide (PI) or polyethylene glycol terephthalate (which may also be referred to as polyethylene terephthalate, PET). Alternatively, the dielectric layer 1 may be made of a glass-based material. In some examples, when the dielectric layer 1 is made of PET, it has a thickness of 250 μm and a dielectric constant of 3.34.

Figure 3:
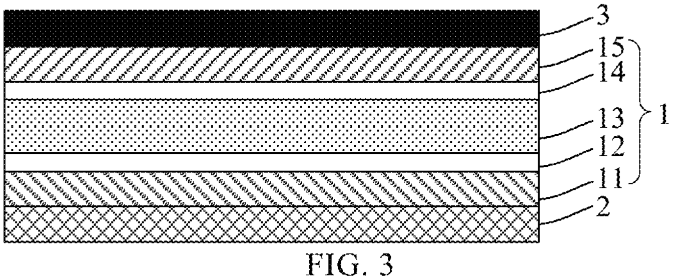
FIG. 3 is a cross-sectional view of another antenna according to an embodiment of the present disclosure.

In some examples, FIG. 3 is a cross-sectional view of another antenna according to an embodiment of the present disclosure. As shown in FIG. 3, the dielectric layer 1 in the antenna is a composite film layer, including a first sub-dielectric layer 11, a first bonding layer 12, a second sub-dielectric layer 13, a second bonding layer 14, and a third sub-dielectric layer 15, which are sequentially stacked on top of each other. The reference electrode layer 2 is disposed on a side of the first sub-dielectric layer 11 distal to the first bonding layer 12, which means that a side surface of the first sub-dielectric layer 11 distal to the first bonding layer 12 serves as the first surface of the dielectric layer 1. The radiation elements 301 are disposed on a side of the third sub-dielectric layer 15 distal to the second bonding layer 14, which means that a side surface of the third sub-dielectric layer 15 distal to the second bonding layer 14 serves as the second surface of the dielectric layer 1. In some examples, the first sub-dielectric layer 11 and the third sub-dielectric layer 15 include, but are not limited to, PI materials; and the second sub-dielectric layer 13 includes, but is not limited to, a polyethylene glycol terephthalate (PET) material. The first bonding layer 12 and the second bonding layer 14 may be made of an optical clear adhesive (OCA).

Figure 4:
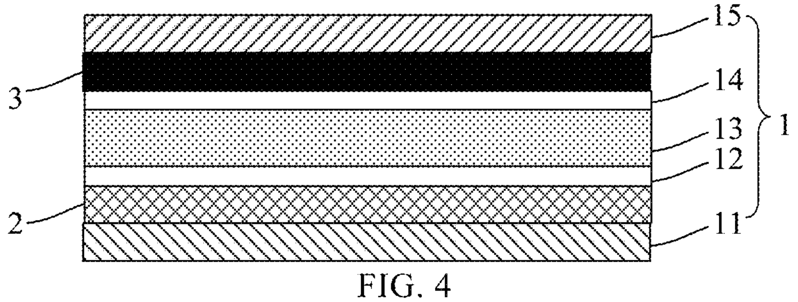
FIG. 4 is a cross-sectional view of another antenna according to an embodiment of the present disclosure.

In some examples, FIG. 4 is a cross-sectional view of another antenna according to an embodiment of the present disclosure. As shown in FIG. 4, the dielectric layer 1 in this antenna has the same structure as the dielectric layer 1 in the antenna shown in FIG. 3, and includes a first sub-dielectric layer 11, a first bonding layer 12, a second sub-dielectric layer 13, a second bonding layer 14, and a third sub-dielectric layer 15, which are sequentially stacked on top of each other. The reference electrode layer 2 is disposed on a side of the first sub-dielectric layer 11 proximal to the first bonding layer 12, which means that a side surface of the first sub-dielectric layer 11 proximal to the first bonding layer 12 serves as the first surface of the dielectric layer 1. The radiation structure 3 is disposed on a side of the third sub-dielectric layer 15 proximal to the second bonding layer 14, which means that a side surface of the third sub-dielectric layer 15 proximal to the second bonding layer 14 serves as the second surface of the dielectric layer 1. In some examples, the first sub-dielectric layer 11 and the third sub-dielectric layer 15 include, but are not limited to, PI materials; and the second sub-dielectric layer 13 includes, but is not limited to, a polyethylene glycol terephthalate (PET) material. The first bonding layer 12 and the second bonding layer 14 may be made of an optical clear adhesive (OCA).

Figure 5:
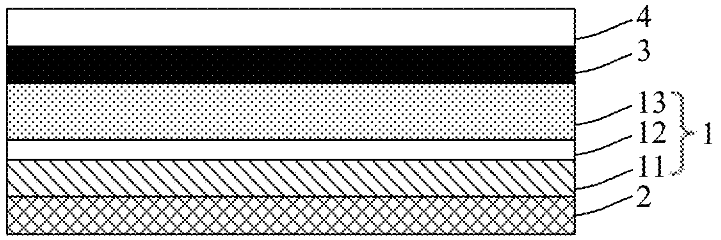
FIG. 5 is a cross-sectional view of another antenna according to an embodiment of the present disclosure.

In some examples, FIG. 5 is a cross-sectional view of another antenna according to an embodiment of the present disclosure. As shown in FIG. 5, the dielectric layer 1 in this antenna includes a first sub-dielectric layer 11, a first bonding layer 12, and a second sub-dielectric layer 13 that are disposed in a stack. A surface of the first sub-dielectric layer 11 distal to the first bonding layer 12 serves as the first surface of the dielectric layer 1. That is, the reference electrode layer 2 is disposed on a side of the first sub-dielectric layer distal to the first bonding layer 12. A surface of the second sub-dielectric layer 13 distal to the first bonding layer 12 serves as the second surface of the dielectric layer 1. That is, the radiation structure is disposed on a side of the second sub-dielectric layer 13 distal to the first bonding layer 12. The first sub-dielectric layer 11 is made of a material including polyimide, and the second sub-dielectric layer 13 is made of a material including polyethylene glycol terephthalate. Alternatively, the first sub-dielectric layer 11 is made of a material including polyethylene glycol terephthalate, and the second sub-dielectric layer 13 is made of a material including polyimide.

In some examples, with continued reference to FIG. 1 and FIG. 2, the first radiation part 31 and the second radiation part 32 of the radiation structure 3 each include two radiation elements 301 spaced apart from each other. In this case, the first microstrip line 4 and the second microstrip line 5 each include one connection part and two branch parts. In other words, the first microstrip line 4 and the second microstrip line 5 each adopt a one-to-two structure. In this case, the two branch parts of the first microstrip line 4 are respectively connected to the two radiation elements 301 in the first radiation part 31. That is, the branch parts of the first microstrip line 4 are connected to the radiation elements 301 in the first radiation part 31 in one-to-one correspondence. Similarly, the two branch parts of the second microstrip line 5 are respectively connected to the two radiation elements 301 in the second radiation part 32. That is, the two branch parts of the second microstrip line 5 are connected to the two radiation elements in the second radiation part 32 in one-to-one correspondence.

With continued reference to FIG. 1 and FIG. 2, orthogonal projections of the first microstrip line 4 and the second microstrip line 5 on the dielectric layer 1 each at least partially overlap an orthogonal projection of the slot in the reference electrode layer 2 on the dielectric layer 1, and orthogonal projections of the branch parts of the first microstrip line 4 and the second microstrip line on the dielectric layer 1 are each located in the orthogonal projection of the slot in the reference electrode layer 2 on the dielectric layer 1. With such arrangement, a radiation direction of a microwave signal can be adjusted.

In some examples, as shown in FIG. 2, one slot 21 in the reference electrode layer 2, one radiation structure 3, one first microstrip line 4, and one second microstrip line 5 correspondingly disposed in the antenna form one antenna unit 10. In some examples, a ratio of a length to a width of the antenna unit 10 is about 1:1, such as 1:0.8 to 1:1.25; and a ratio of the length to a thickness is about 100:1 to 200:1. The slot 21 has a shape the same or substantially the same as a contour shape of the radiation structure 3. For example: the slot 21 has a rectangular shape, and the radiation structure 3 also has a rectangular contour shape. FIG. 2 takes the slot 21 and the radiation structure 3 both being rectangular as an example. In this case, each radiation structure 3 includes four radiation parts. That is, the radiation structure 3 includes not only the first radiation part 31 and the second radiation part 32, but also a third radiation part 33 and a fourth radiation part 34. For example: the third radiation part 33 is disposed opposite to the first radiation part 31, and the fourth radiation part 34 is disposed opposite to the second radiation part 32. Each radiation part has a triangular contour, and each radiation element 301 has a triangular plate-shaped structure. That is, each radiation structure 3 is composed of 8 radiation elements 301 having the triangular plate-shaped structure. With continued reference to FIG. 1, the 8 triangular plate-shaped radiation elements 301 in each radiation structure 3 are spaced apart from each other to define a double-cross shaped opening (i.e., this opening having a shape of a "*" or of an asterisk), with two horizontally arranged triangular plate-shaped radiation elements 301 connected to the first microstrip line 4, and two vertically arranged triangular plate-shaped radiation elements 301 connected to the second microstrip line 5. A feed end 41 of the first microstrip line 4 corresponds to horizontal polarization, and a feed end 51 of the second microstrip line 5 corresponds to vertical polarization. In some examples, a distance between the two radiation elements 301 in each radiation part is d1, a distance between adjacent radiation parts in each radiation structure 3 is d2, and d2>d1. Such arrangement is provided because the first microstrip line 4 has a feed direction different from that of the second microstrip line 5, and interference between the feed lines in the two polarization directions is avoided by appropriately setting the distance between the radiation parts.

Figure 6:
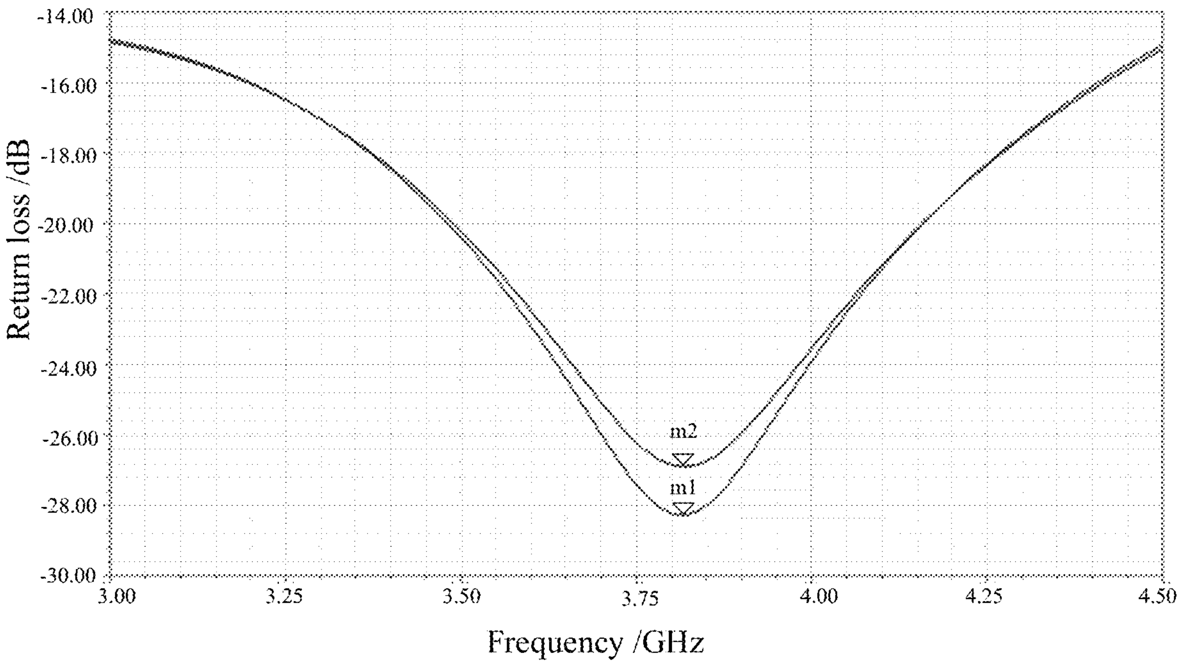
FIG. 6 is a S11 parameter graph (including two S11 parameter curves) of a feed end of a first microstrip line and a feed end of a second microstrip line of the antenna unit shown in FIG. 2.
Figure 7A:
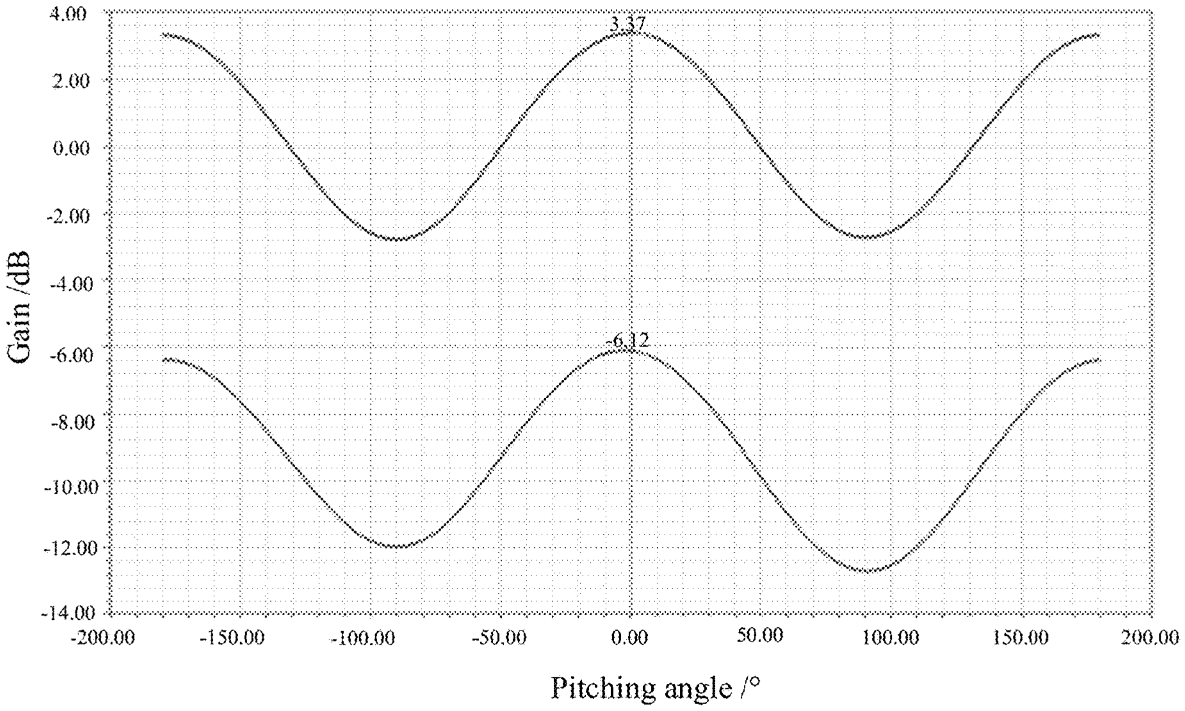
FIG. 7*a* is a planar radiation pattern obtained by exciting the feed end of the first microstrip line of the antenna unit shown in FIG. 2 when f=3.75 GHz.
Figure 7B:
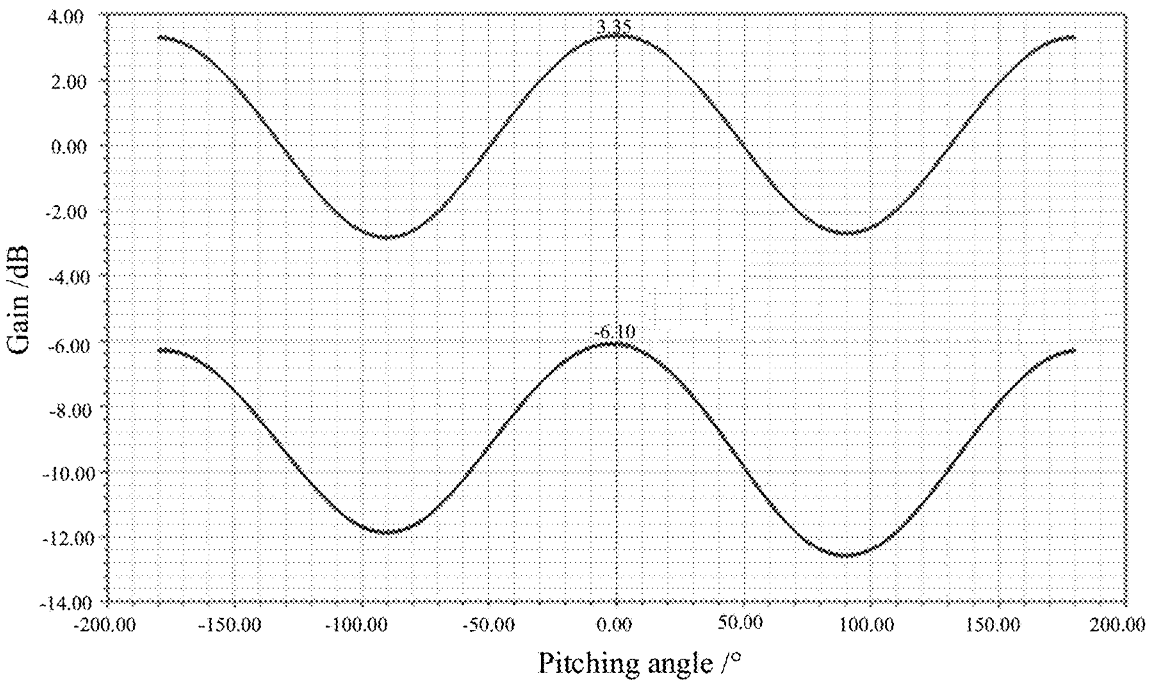
FIG. 7*b* is a planar radiation pattern obtained by exciting the feed end of the second microstrip line of the antenna unit shown in FIG. 2 when f=3.75 GHz.

FIG. 6 is a S11 parameter graph (including two S11 parameter curves) of the feed end 41 of the first microstrip line 4 and the feed end 51 of the second microstrip line 5 of the antenna unit 10 in FIG. 2. The feed end 41 of the first microstrip line 4 and the feed end 51 of the second microstrip line 5 each have an impedance bandwidth of 1.5 GHz (from 3 GHz to 4.5 GHz, S11<−10 dB)/1.5 GHz (from 3 GHz to 4.5 GHz, S11<−6 dB), and a center frequency of 3.82 GHz, as shown by m1 and m2 in FIG. 6. FIG. 7*a* is a planar radiation pattern obtained by exciting the feed end 41 of the first microstrip line 4 of the antenna unit 10 in FIG. 2 when f=3.75 GHz. As shown in FIG. 7*a*, at the frequency of 3.75 GHz, a gain (at 0°/90°) of the antenna unit 10 obtained by exciting the feed end 41 of the first microstrip line 4 is 3.37 dBi/−6.12 dBi, and a half-power beamwidth (which may also be referred to as a half-power lobe width) thereof is 92°/74°. FIG. 7*b* is a planar radiation pattern obtained by exciting the feed end 51 of the second microstrip line 5 of the antenna unit 10 in FIG. 2 when f=3.75 GHz. As shown in FIG. 7*b*, a gain (at 0°/90°) of the antenna unit 10 obtained by exciting the feed end 51 of the second microstrip line 5 is −6.10 dBi/3.35 dBi, and a half-power beamwidth thereof is 92°/74°.

Figure 8:
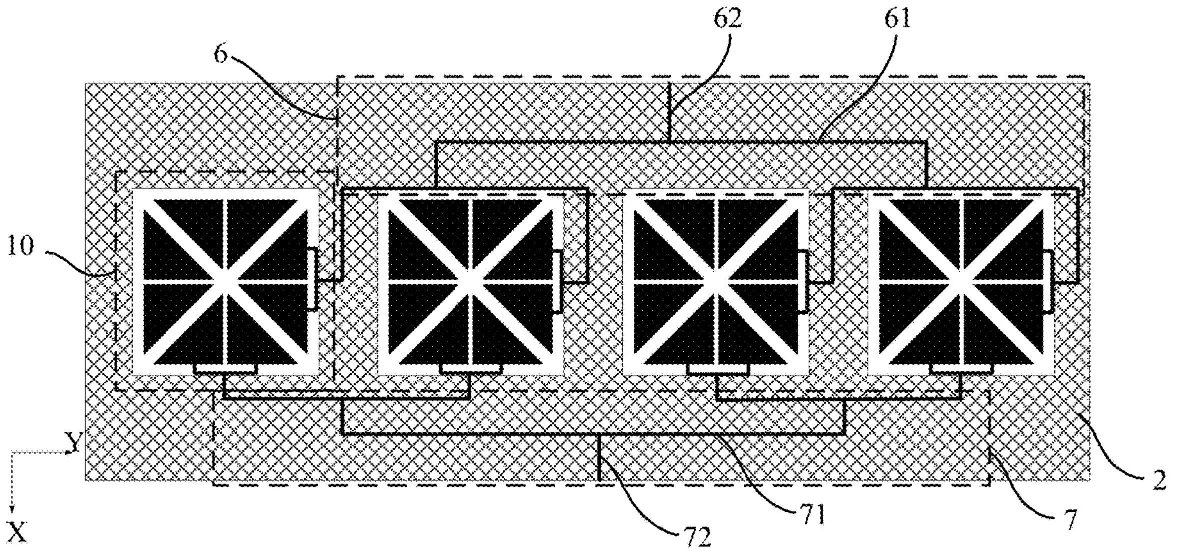
FIG. 8 is a top view of another antenna according to an embodiment of the present disclosure.

In some examples, FIG. 8 is a schematic diagram of another antenna according to an embodiment of the present disclosure. As shown in FIG. 8, the antenna includes four antenna units 10 as described above, and further includes a first feed structure 6 and a second feed structure 7, and a ratio of the width of each antenna unit 10 of that antenna to a distance from the antenna unit 10 to an adjacent antenna unit 10 is about 2:1, such as 1.9:0.95 to 1.8:0.85. The first feed structure 6 and the second feed structure 7 are both located on the second surface of the dielectric layer 1. An orthogonal projection of the first feed structure 6 on the dielectric layer 1 overlaps at least partially an orthogonal projection of the first microstrip line 4 on the dielectric layer 1, and the first feed structure 6 is configured to feed power to the first microstrip line 4. An orthogonal projection of the second feed structure 7 on the dielectric layer 1 overlaps at least partially an orthogonal projection of the second microstrip line 5 on the dielectric layer 1, and the second feed structure 7 is configured to feed power to the second microstrip line 5. In one example, the first microstrip line 4 and the first feed structure 6 are arranged in a same layer. In this case, the first microstrip line 4 and the first feed structure 6 are directly electrically connected. The second microstrip line 5 and the second feed structure 7 are arranged in a same layer. In this case, the second microstrip line 5 and the second feed structure 7 are directly electrically connected. Alternatively, the first microstrip line 4 and the first feed structure 6 may be arranged in different layers, where the first feed structure 6 feeds power to the first microstrip line 4 in a coupling manner. Similarly, the second microstrip line 5 and the second feed structure 7 are arranged in different layers, where the second feed structure 7 feeds power to the second microstrip line 5 in a coupling manner.

In one example, when $2^n$ slots 21 are provided in the reference electrode layer 2, also $2^n$ radiation structures 3 are provided. Meanwhile, the first feed structure 6 includes n levels of third microstrip lines 61, and the second feed structure 7 includes n levels of fourth microstrip lines 71. One 1st level third microstrip line 61 is connected to two adjacent first microstrip lines 4, and different 1st level third microstrip lines 61 are connected to different first microstrip lines 4. One $m^{th}$ level third microstrip line 61 is connected to two adjacent $(m-1)^{th}$ level third microstrip lines 61, and different $m^{th}$ level third microstrip lines 61 are connected to different $(m-1)^{th}$ level third microstrip lines 61. One 1st level fourth microstrip line 71 is connected to two adjacent second microstrip lines 5, and different 1st level fourth microstrip lines 71 are connected to different second microstrip lines 5. One $m^{th}$ level fourth microstrip line 71 is connected to two adjacent $(m-1)^{th}$ level fourth microstrip lines 71, and different $m^{th}$ level fourth microstrip lines 71 are connected to different $(m-1)^{th}$ level fourth microstrip lines 71. In the above, n≥2, 2≤m≤n, and m and n are both integers.

Taking the antenna shown in FIG. 8 as an example, the antenna includes 4 radiation structures 3, where n is 2. In other words, the first feed structure 6 includes 3 third microstrip lines 61 in 2 levels, and the second feed structure 7 includes 3 fourth microstrip lines 71 in 2 levels. One 1st level third microstrip line 61 is connected to feed ends 41 of the 1st and 2nd first microstrip lines 4 from left to right, and the other 1st level third microstrip line 61 is connected to feed ends 41 of the 3rd and 4th first microstrip lines 4 from left to right; and the 2nd level third microstrip line 61 is connected to the feed ends of the two 1st level third microstrip lines 61. Similarly, one 1st level fourth microstrip line 71 is connected to feed ends 51 of the 1st and 2nd second microstrip lines 5 from left to right, and the other 1st level fourth microstrip line 71 is connected to feed ends 51 of the 3rd and 4th second microstrip lines 5 from left to right; and the 2nd level fourth microstrip line 71 is connected to the feed ends of the two 1st level fourth microstrip lines 71. In this case, the feed end of the 2nd level third microstrip line 61 in the first feed structure 6 (i.e., the feed end 62 of the first feed structure 6) corresponds to horizontal polarization, and the feed end of the 2nd level fourth microstrip line 71 in the second feed structure 7 (i.e., the feed end 72 of the second feed structure 7) corresponds to vertical polarization.

Figure 9:
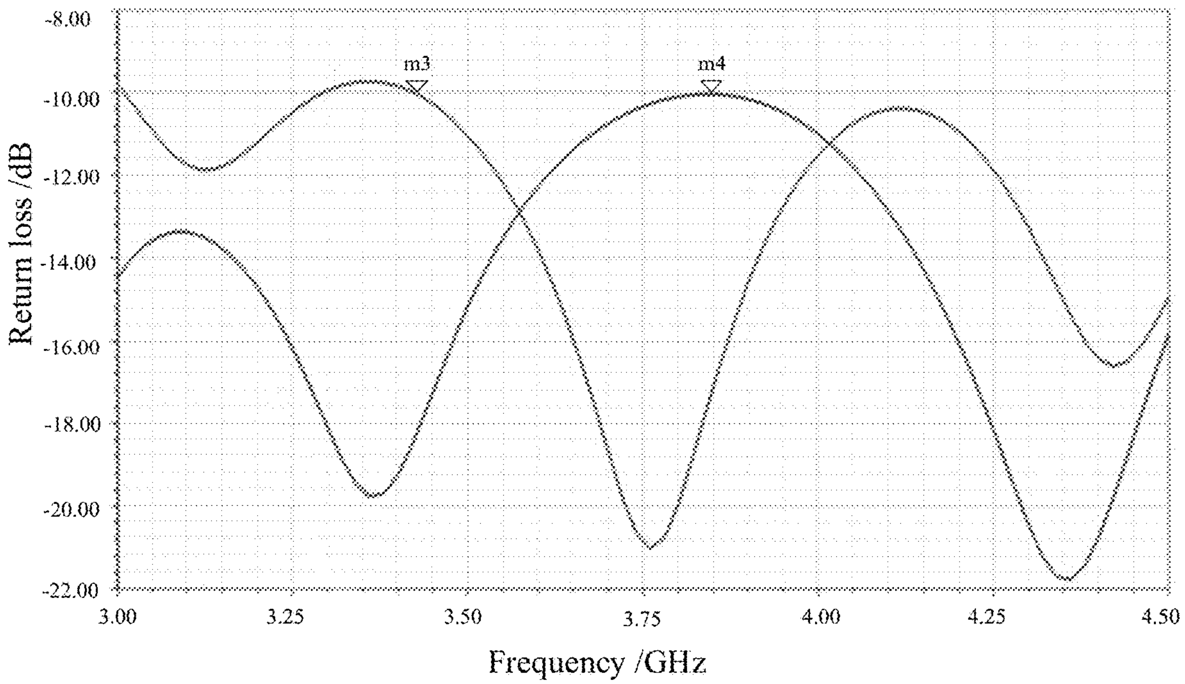
FIG. 9 is a S11 parameter graph (including two S11 parameter curves) of the feed end of the first feed structure and the feed end of the second feed structure of the antenna shown in FIG. 8.
Figure 10A:
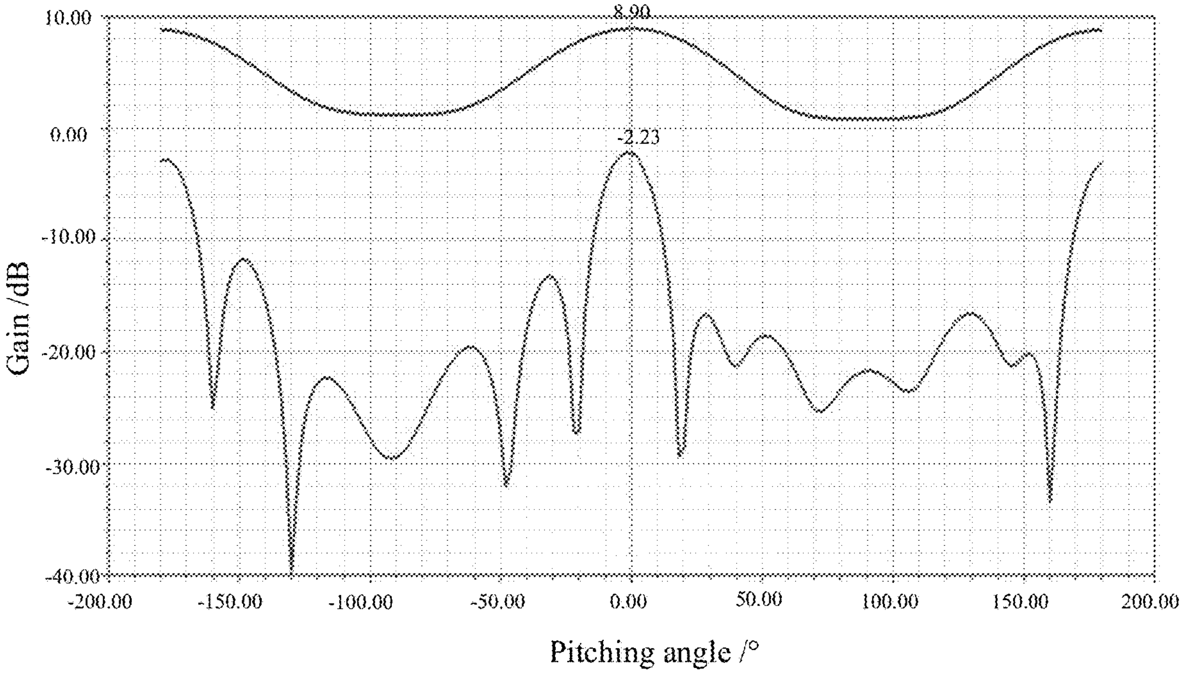
FIG. 10*a* is a planar radiation pattern obtained by exciting the feed end of the first feed structure of the antenna shown in FIG. 8 when f=3.75 GHz.
Figure 10B:
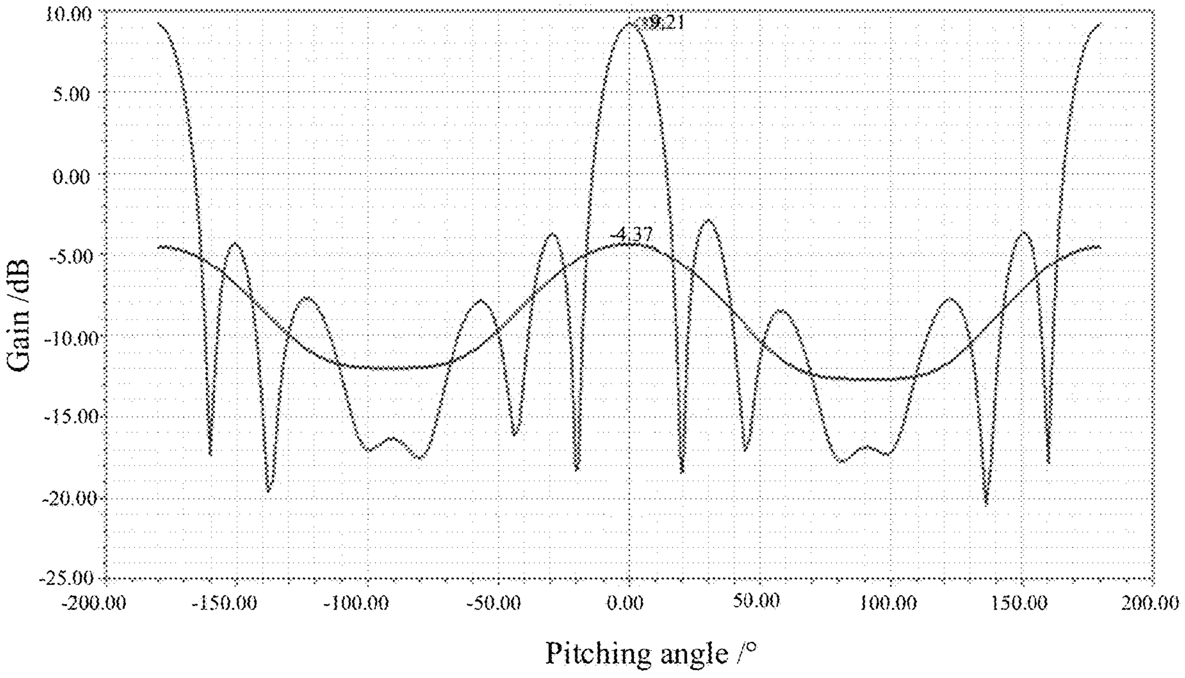
FIG. 10*b* is a planar radiation pattern obtained by exciting the feed end of the second feed structure of the antenna shown in FIG. 8 when f=3.75 GHz.

FIG. 9 is a S11 parameter graph (including two S11 parameter curves) of the feed end 62 of the first feed structure 6 and the feed end 72 of the second feed structure 7 of the antenna shown in FIG. 8. The feed end 62 of the first feed structure 6 has an impedance bandwidth of 1.08 GHz (from 3.42 GHz to 4.5 GHz, S11<−10 dB)/1.5 GHz (from 3 GHz to 4.5 GHz, S11<−6 dB), as shown by m3 in FIG. 9, and the feed end 72 of the second feed structure 7 has an impedance bandwidth of 1.5 GHz (from 3 GHz to 4.5 GHz, S11<−10 dB)/1.5 GHz (from 3 GHz to 4.5 GHz, S11<−6 dB), as shown by m4 in FIG. 9. FIG. 10*a* is a planar radiation pattern obtained by exciting the feed end 62 of the first feed structure 6 of the antenna in FIG. 8 when f=3.75 GHz. As shown in FIG. 10*a*, a gain (at 0°/90°) of the antenna unit 10 obtained by exciting the feed end 62 of the first feed structure 6 is 8.90 dBi/−2.23 dBi, and a half-power beamwidth thereof is 67°/19°. FIG. 10*b* is a planar radiation pattern obtained by exciting the feed end 72 of the second feed structure 7 of the antenna in FIG. 8 when f=3.75 GHz. As shown in FIG. 10*b*, at the frequency of 3.75 GHz, a gain (at 0°/90°) of the antenna unit 10 obtained by exciting the feed end 72 of the second feed structure 7 is −4.37 dBi/9.21 dBi, and a half-power beamwidth thereof is 17°/64°.

Figure 11:
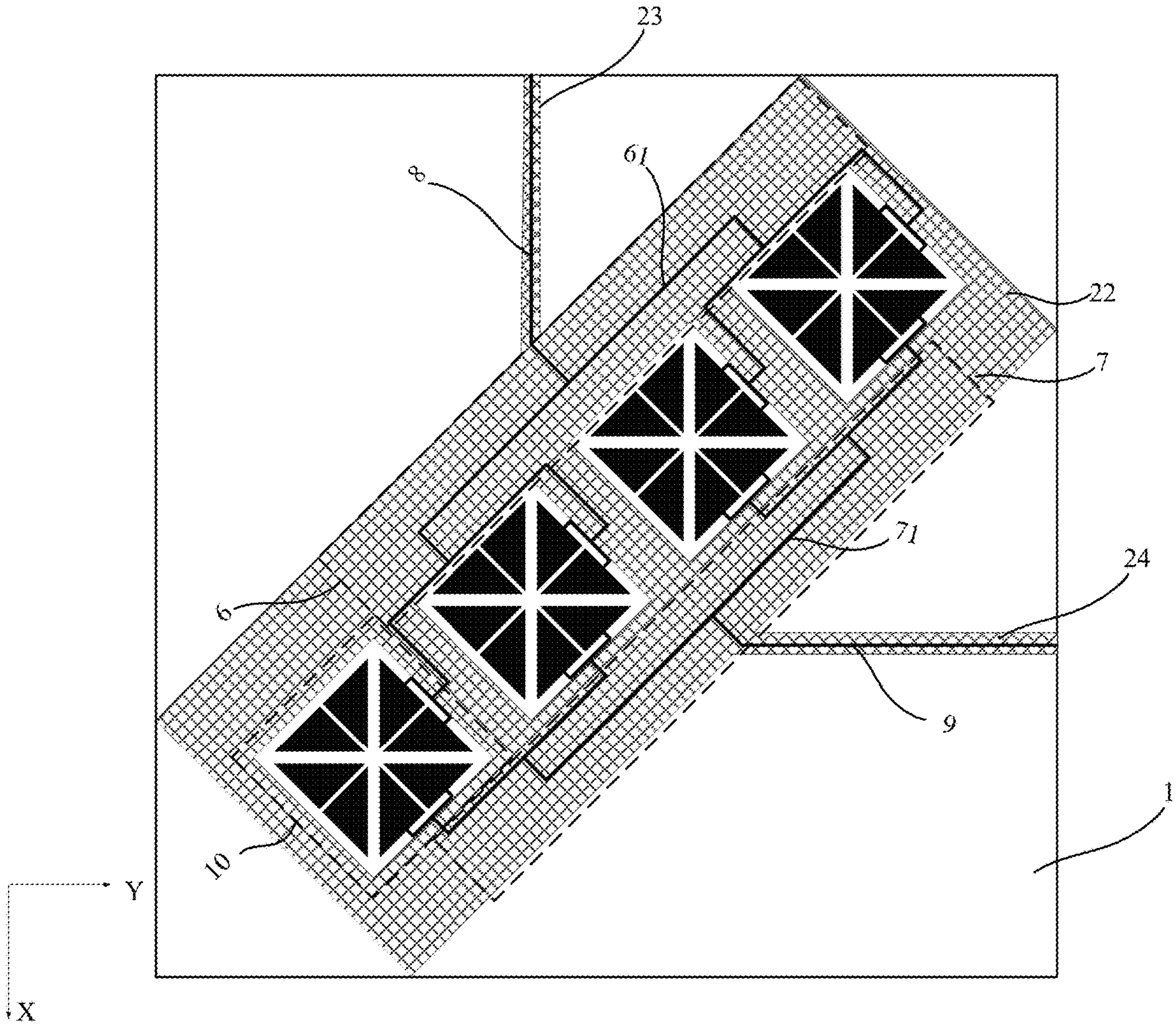
FIG. 11 is a top view of another antenna according to an embodiment of the present disclosure.

In some examples, FIG. 11 is a top view of another antenna according to an embodiment of the present disclosure. As shown in FIG. 11, this antenna has substantially the same structure as the antenna shown in FIG. 8, except that the antenna units 10 of this antenna are rotated by 45° as a whole compared with the antenna units 10 of the antenna in FIG. 8. Specifically, the reference electrode layer 2 of the antenna includes a body part 22, a first branch 23 and a second branch 24, and the first branch 23 and the second branch 24 are respectively connected to two sides of the body part 22 in a lengthwise direction of the body part 22. The antenna further includes a fifth microstrip line 8 connected to the feed end 62 of the first feed structure 6, and a sixth microstrip line 9 connected to the feed end 72 of the second feed structure 7. An orthogonal projection of the fifth microstrip line 8 on the dielectric layer 1 is located in an orthogonal projection of the first branch 23 on the dielectric layer 1. An orthogonal projection of the sixth microstrip line 9 on the dielectric layer 1 is located in an orthogonal projection of the second branch 24 on the dielectric layer 1. A perpendicular bisector of a width of the body part 22 coincides with one diagonal line of the dielectric layer 1. An extending direction of the fifth microstrip line 8 is perpendicular to an extending direction of the sixth microstrip line 9, and an angle between the extending direction of each of the fifth and sixth microstrip lines and the diagonal line of the dielectric layer 1 is 45°. Taking FIG. 11 as an example, a feed end of the fifth microstrip line 8 corresponds to +45° polarization, and a feed end of the sixth microstrip line 9 corresponds to −45° polarization. That is, the antenna shown in FIG. 11 can realize polarization of ±45°.

Figure 12:
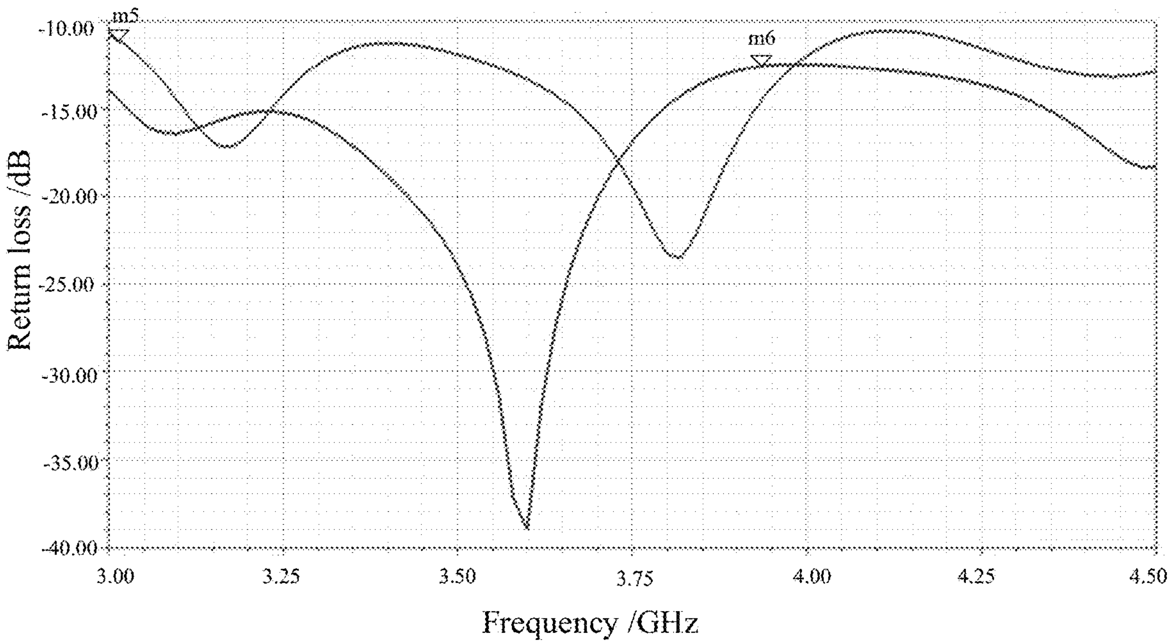
FIG. 12 is a S11 parameter graph (including two S11 parameter curves) of a feed end of a fifth microstrip line and a feed end of a sixth microstrip line of the antenna unit shown in FIG. 11.
Figure 13A:
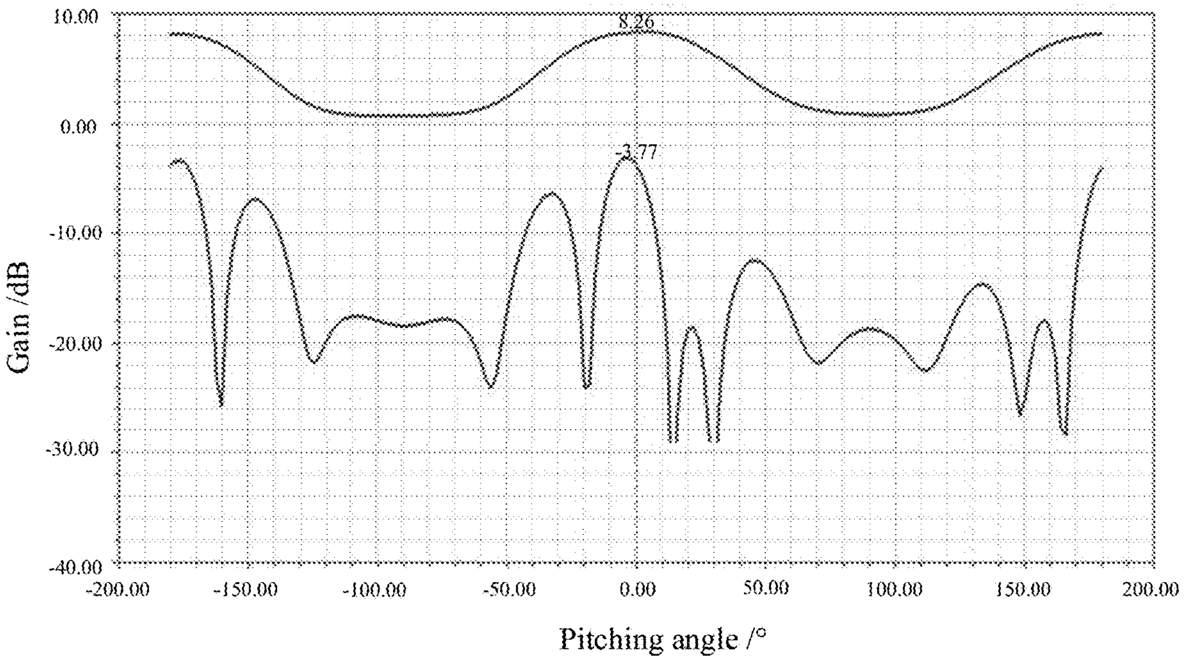
FIG. 13*a* is a planar radiation pattern obtained by exciting the feed end of the fifth microstrip line of the antenna shown in FIG. 11 when f=3.75 GHz.
Figure 13B:
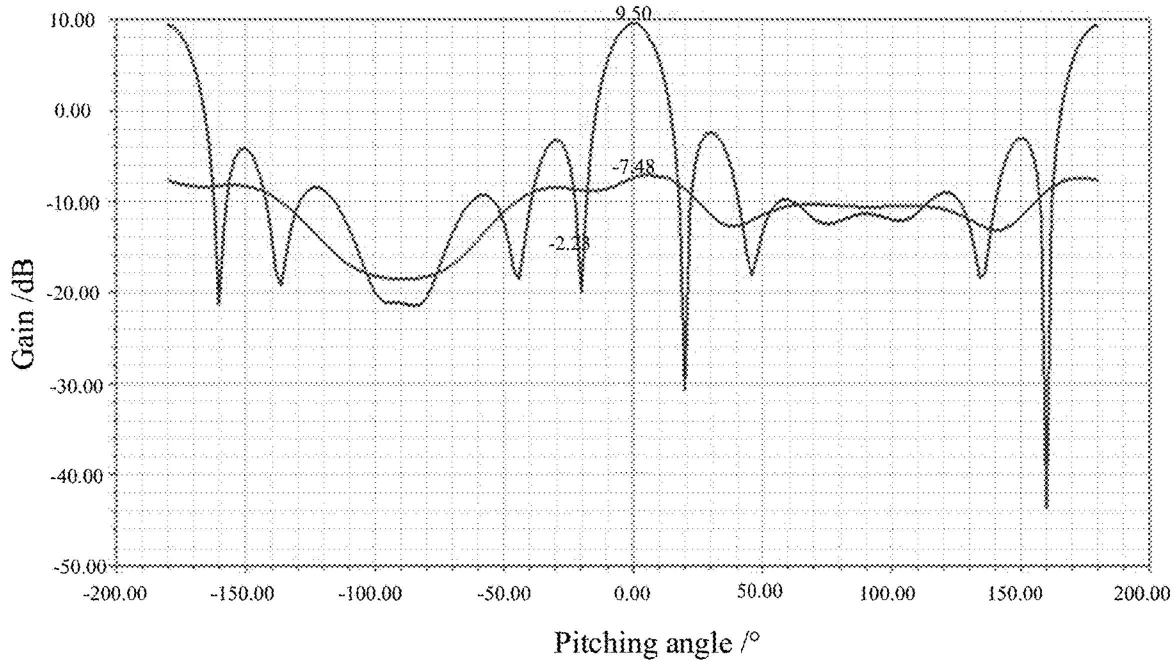
FIG. 13*b* is a planar radiation pattern obtained by exciting the feed end of the sixth microstrip line of the antenna shown in FIG. 11 when f=3.75 GHz.

FIG. 12 is a S11 parameter graph (including two S11 parameter curves) of the feed end of the fifth microstrip line 8 and the feed end of the sixth microstrip line 9 of the antenna unit 10 in FIG. 11. The feed end of the fifth microstrip line 8 and the feed end of the sixth microstrip line 9 each have an impedance bandwidth of 1.5 GHz (from 3 GHz to 4.5 GHz, S11<−10 dB)/1.5 GHz (from 3 GHz to 4.5 GHz, S11<−6 dB), as shown by m5 and m6 in FIG. 12. FIG. 13*a* is a planar radiation pattern obtained by exciting the feed end of the fifth microstrip line 8 of the antenna in FIG. 11 when f=3.75 GHz. As shown in FIG. 13*a*, a gain (at −45°/45°) of the antenna unit 10 obtained by exciting the feed end of the fifth microstrip line 8 is −3.77 dBi/8.26 dBi, and a half-power beamwidth thereof is 70°/15°. FIG. 13*b* is a planar radiation pattern obtained by exciting the feed end of the sixth microstrip line 9 of the antenna in FIG. 11 when f=3.75 GHz. As shown in FIG. 13*b*, at the frequency of 3.75 GHz, a gain (at −45°/45°) of the antenna unit 10 obtained by exciting the feed end of the sixth microstrip line 9 is 9.50 dBi/−7.48 dBi, and a half-power beamwidth thereof is 17°/62°.

Figure 14:
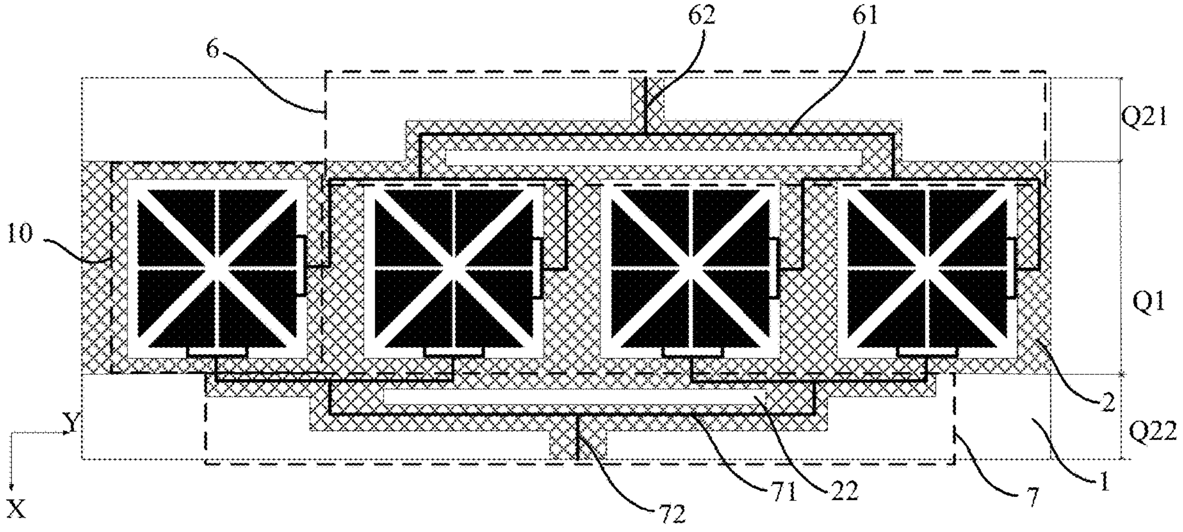
FIG. 14 is a top view of another antenna according to an embodiment of the present disclosure.

In some examples, FIG. 14 is a top view of another antenna according to an embodiment of the present disclosure. As shown in FIG. 14, this antenna has substantially the same structure as the antenna shown in FIG. 2, except the structure of the reference electrode layer 2. Specifically, the antenna shown in FIG. 14 may be divided into a radiation region Q1 and feed regions Q21 and Q22. The radiation structure 3 is located in the radiation region Q1, the first feed structure 6 is located in the feed region Q21, and the second feed structure 7 is located in the feed region Q22. The reference electrode layer includes not only the slot 21 in the radiation region but also an auxiliary slot 22 located in each of the feed regions Q21 and Q22, and an orthogonal projection of the auxiliary slot 22 on the dielectric layer 1 does not overlap orthogonal projections of the first feed structure 6 and the second feed structure 7 on the dielectric layer 1. In addition, an outer contour of part of the reference electrode layer 2 in the feed region Q21 is the same as an outer contour of the first feed structure 6, and an outer contour of part of the reference electrode layer 2 in the feed region Q22 is the same as an outer contour of the second feed structure 7. The auxiliary slot 22 can not only improve the optical transmittance of the antenna, but also change the radiation direction of the microwave signal. It should be noted here that a total area of the auxiliary slots 22 in the reference electrode layer may be as large as possible, as long as it is ensured that the orthogonal projection of the reference electrode layer 2 on the dielectric layer 1 overlaps and covers the orthogonal projections of the first feed structure 6 and the second feed structure 7 on the dielectric layer 1.

In some examples, the reference electrode layer 2, the first microstrip line 4, the second microstrip line 5, the third microstrip line 61, the fourth microstrip line 71, the fifth microstrip line, the sixth microstrip line 9 and the radiation element 301 each include, but are not limited to, a material of aluminum or copper.

In summary, the antenna in any one of the foregoing embodiments of the present disclosure is mainly directed to 5G base station communication and mobile communication applications in the frequency bands of n77 (from 3.3 GHz to 4.2 GHz) and n78 (from 3.3 GHz to 3.8 GHz), and adopts a design of a double-cross shaped slot rectangular radiation structure 3 having a rectangular slot and a combination of two-way symmetric feed lines, which is combined with the use of a transparent flexible base material, and makes the antenna unit 10 and the array have technical features such as wide bandwidth, high gain, miniaturization, dual polarization, partial transparency, good conformality, and the like.

In a second aspect, an embodiment of the present disclosure provides a method for manufacturing an antenna, which may be used for manufacturing the antenna according to any one of the embodiments as described above. The manufacturing method in the embodiment of the present disclosure includes the following steps S1 to S3. Step S1 includes providing a dielectric layer 1.

The dielectric layer 1 may be a flexible substrate or a glass substrate, and step S1 may include a step of cleaning the dielectric layer 1.

Step S2 includes forming a pattern including a reference electrode layer 2 on a first surface of the dielectric layer 1 through a patterning process. A slot 21 is formed in the reference electrode layer 2.

In some examples, step S2 may specifically include: depositing a first metal film on the first surface of the dielectric layer 1 in a manner including, but not limited to, magnetron sputtering; nest, coating a photoresist thereon that is subjected to exposing and developing, and then performing wet etching; and stripping the photoresist after etching, to form the pattern including a reference electrode layer 2.

S3 includes forming a pattern including a radiation structure 3, a first microstrip line 4 and a second microstrip line 5 on a second surface of the dielectric layer 1 through a patterning process. An orthogonal projection of one radiation structure 3 on the dielectric layer 1 is located in an orthogonal projection of the slot 21 on the dielectric layer 1.

The radiation structure 3 has a structure shown in FIG. 2, and includes a plurality of radiation parts spaced apart from each other, each of which includes radiation elements 301 spaced apart from each other. For example: the radiation parts in each radiation structure 3 include at least a first radiation part 31 and a second radiation part 32; and in this case, the first radiation part 31 and the second radiation part 32 each include radiation elements 301 spaced apart from each other. It should be noted that, in the embodiment of the present disclosure, the description is made by taking the case where two radiation elements 301 spaced apart from each other are included in each radiation part as an example, but it will be appreciated that the number of radiation parts in each radiation part is not limited to two, and may be specifically set according to the performance requirement of the antenna.

Apparently, in some examples, the radiation element 301 and the first and second microstrip lines 4, 5 may be manufactured through two separate patterning processes.

In some examples, step S3 may specifically include depositing a second metal film on the first surface of the dielectric layer 1 in a manner including, but not limited to, magnetron sputtering; next, coating a photoresist thereon that is subjected to exposing and developing, and then performing wet etching; and stripping the photoresist after etching, to form the pattern including the radiation structure 3, the first microstrip line 4 and the second microstrip line 5.

It should be noted here that the above steps S2 and S3 are exchangeable in the manufacturing sequence. That is, the radiation structure 3, the first microstrip line 4 and the second microstrip line 5 may be formed on the second surface of the dielectric layer 1, and then the reference electrode layer 2 is formed on the first surface of the dielectric layer 1, which is also within the protection scope of the embodiment of the present disclosure.

In some examples, as shown in FIG. 3, the dielectric layer 1 in the embodiment of the present disclosure includes a first sub-dielectric layer 11, a first bonding layer 12, a second sub-dielectric layer 13, a second bonding layer 14, and a third sub-dielectric layer 15, which are sequentially stacked on top of each other. A surface of the first sub-dielectric layer 11 distal to the first bonding layer 12 serves as the first surface of the dielectric layer 1. A surface of the third sub-dielectric layer 15 distal to the second bonding layer 14 serves as the second surface of the dielectric layer 1. In other words, the reference electrode layer 2 is formed on a side of the first sub-dielectric layer 11 distal to the first bonding layer 12, and the radiation structure 3, the first microstrip line 4 and the second microstrip line 5 are formed on a side of the third sub-dielectric layer 15 distal to the second bonding layer 14. Alternatively, as shown in FIG. 4, the reference electrode layer 2 may be formed on a side of the first sub-dielectric layer 11 proximal to the first bonding layer 12, and the radiation structure 3, the first microstrip line 4 and the second microstrip line 5 may be formed on a side of the third sub-dielectric layer 15 proximal to the second bonding layer 14.

In addition, in an embodiment of the present disclosure, the antenna structure includes not only the dielectric layer 1, the reference electrode layer 2, the radiation structure 3, the first microstrip line 4, and the second microstrip line 5 formed as described above, but also a first feed structure 6, a second feed structure 7, or other elements formed on the second surface of the dielectric layer 1, which are not enumerated here.

It will be appreciated that the above implementations are merely exemplary implementations for the purpose of illustrating the principle of the disclosure, and the disclosure is not limited thereto. It will be apparent to one of ordinary skill in the art that various modifications and variations can be made to the present disclosure without departing from the spirit and essence of the present disclosure. Such modifications and variations should also be considered as falling into the protection scope of the present disclosure.

What is claimed is:

1. An antenna, comprising:

a dielectric layer with a first surface and a second surface opposite to each other;

a reference electrode layer on the first surface of the dielectric layer and with at least one slot therein;

at least one radiation structure on the second surface of the dielectric layer, with an orthogonal projection of one radiation structure on the dielectric layer located in an orthogonal projection of one slot on the dielectric layer; wherein each radiation structure comprises a plurality of radiation parts spaced apart from each other, each of which comprises radiation elements spaced apart from each other; and the plurality of radiation parts in each radiation structure comprise at least a first radiation part and a second radiation part; and at least one first microstrip line and at least one second microstrip line on the second surface of the dielectric layer; wherein one first microstrip line is configured to feed power to the radiation elements in one first radiation part, one second microstrip line is configured to feed power to the radiation elements in one second radiation part, and the first microstrip line has a feed direction different from that of the second microstrip line.

2. The antenna according to claim 1, wherein the feed direction of one of the first microstrip line and the second microstrip line is a vertical direction and the feed direction of the other of the first microstrip line and the second microstrip line is a horizontal direction.

3. The antenna according to claim 1, wherein the first radiation part and the second radiation part each comprise two radiation elements spaced apart from each other; the first microstrip line and the second microstrip line each comprise one connection part and two branch parts connected with the connection part; the two branch parts of the first microstrip line are respectively connected to the two radiation elements in the first radiation part; and the two branch parts of the second microstrip line are respectively connected to the two radiation elements in the second radiation part.

4. The antenna according to claim 3, wherein orthogonal projections of the first microstrip line and the second microstrip line on the dielectric layer each at least partially overlap the orthogonal projection of the slot on the dielectric layer; and orthogonal projections of the two branch parts of the first microstrip line and the two branch parts of the second microstrip line on the dielectric layer are each located in the orthogonal projection of the slot on the dielectric layer.

5. The antenna according to claim 1, wherein the plurality of radiation parts in the radiation structure further comprise: a third radiation part and a fourth radiation part; wherein the third radiation part is opposite to the first radiation part, and the fourth radiation part is opposite to the second radiation part.

6. The antenna according to claim 5, wherein each radiation element has a triangular plate-shaped structure, the first, second, third and fourth radiation parts each comprise two radiation elements spaced apart from each other, and the radiation elements in the radiation structure form a double-cross shaped opening.

7. The antenna according to claim 1, wherein the radiation structure has a rectangular contour, and the slot is rectangular.

8. The antenna according to claim 1, wherein in each radiation structure, a distance between the radiation parts is greater than a distance between the radiation elements.

9. The antenna according to claim 1, further comprising a first feed structure and a second feed structure, wherein the first feed structure and the second feed structure are each on the second surface of the dielectric layer, an orthogonal projection of the first feed structure on the dielectric layer overlaps at least partially an orthogonal projection of the first microstrip line on the dielectric layer, and an orthogonal projection of the second feed structure on the dielectric layer overlaps at least partially an orthogonal projection of the second microstrip line on the dielectric layer.

10. The antenna according to claim 9, wherein the first feed structure is electrically connected to the first microstrip line; and the second feed structure is electrically connected to the second microstrip line.

11. The antenna according to claim 9, wherein the number of the at least one slot is $2^n$, the first feed unit comprises n levels of third microstrip lines, and the second feed unit comprises n levels of fourth microstrip lines;

one 1st level third microstrip line is connected to two adjacent first microstrip lines, and different 1st level third microstrip lines are respectively connected to different first microstrip lines; and one $m^{th}$ level third microstrip line is connected to two adjacent $(m-1)^{th}$ level third microstrip lines, and different $m^{th}$ level third microstrip lines are respectively connected to different $(m-1)^{th}$ level third microstrip lines; and one 1st level fourth microstrip line is connected to two adjacent second microstrip lines, and different 1st level fourth microstrip lines are respectively connected to different second microstrip lines; and one $m^{th}$ level fourth microstrip line is connected to two adjacent $(m-1)^{th}$ level fourth microstrip lines, and different $m^{th}$ level fourth microstrip lines are respectively connected to different $(m-1)^{th}$ level fourth microstrip lines; where $n \geq 2$, $2 \leq m \leq n$, and m and n are both integers.

12. The antenna according to claim 9, wherein the reference electrode layer comprises a body part, a first branch and a second branch; the first branch and the second branch are respectively connected to two sides of the body part in a lengthwise direction of the body part; the antenna further comprises a fifth microstrip line and a sixth microstrip line; the fifth microstrip line is connected to the first feed structure, and an orthogonal projection of the fifth microstrip line on the dielectric layer is located in an orthogonal projection of the first branch on the dielectric layer; the sixth microstrip line is connected to the second feed structure, and an orthogonal projection of the sixth microstrip line on the dielectric layer is located in an orthogonal projection of the second branch on the dielectric layer; and a perpendicular bisector of a width of the body part coincides with one diagonal line of the dielectric layer; and an extending direction of the fifth microstrip line is perpendicular to an extending direction of the sixth microstrip line, and an angle between the extending direction of each of the fifth and sixth microstrip lines and the diagonal line of the dielectric layer is 45°.

13. The antenna according to claim 9, wherein the antenna comprises feed regions and a radiation region; the first feed structure and the second feed structure are respectively in the feed regions; the radiation structure is in the radiation region; the reference electrode layer further comprises at least one auxiliary slot located in each of the feed regions; and an orthogonal projection of the auxiliary slot on the dielectric layer does not overlap orthogonal projections of the first feed structure and the second feed structure on the dielectric layer.

14. The antenna according to claim 1, wherein the dielectric layer comprises a first sub-dielectric layer, a first bonding layer, a second sub-dielectric layer, a second bonding layer, and a third sub-dielectric layer disposed in a stack, wherein a surface of the first sub-dielectric layer distal to the first bonding layer serves as the first surface of the dielectric layer, and a surface of the third sub-dielectric layer distal to the second bonding layer serves as the second surface of the dielectric layers; or wherein the dielectric layer comprises a first sub-dielectric layer, a first bonding layer, a second sub-dielectric laver, a second bonding laver, and a third sub-dielectric layer disposed in a stack, wherein a surface of the first sub-dielectric layer proximal to the first bonding layer serves as the first surface of the dielectric laver, and a surface of the third sub-dielectric layer proximal to the second bonding layer serves as the second surface of the dielectric layer.

15. The antenna according to claim 14, wherein the first sub-dielectric layer and the third sub-dielectric layer each comprise polyimide; and the second sub-dielectric layer comprises polyethylene glycol terephthalate.

16. The antenna according to claim 1, wherein the dielectric layer comprises a first sub-dielectric layer, a first bonding layer and a second sub-dielectric layer disposed in a stack, wherein a surface of the first sub-dielectric layer distal to the first bonding layer serves as the first surface of the dielectric layer, and a surface of the second sub-dielectric layer distal to the first bonding layer serves as the second surface of the dielectric layer; and the first sub-dielectric layer comprises a material of polyimide, and the second sub-dielectric layer comprises a material of polyethylene glycol terephthalate, or the first sub-dielectric layer comprises a material of polyethylene glycol terephthalate, and the second sub-dielectric layer comprises a material of polyimide.

17. The antenna according to claim 1, wherein the dielectric layer has a single-layer structure and comprises a material of polyimide or polyethylene glycol terephthalate.

18. The antenna according to claim 1, wherein the at least one slot comprises a plurality of slots arranged side by side, with a constant distance between adjacent slots.

19. A method for manufacturing an antenna, comprising:

providing a dielectric layer;

forming a pattern comprising a reference electrode layer on a first surface of the dielectric layer through a patterning process; wherein a slot is formed in the reference electrode layer; and forming a pattern comprising at least one radiation structure, at least one first microstrip line and at least one second microstrip line on a second surface of the dielectric layer through a patterning process; wherein an orthogonal projection of one radiation structure on the dielectric layer is located in an orthogonal projection of the slot on the dielectric layer; the radiation structure comprises a plurality of radiation parts spaced apart from each other, each of which comprises radiation elements spaced apart from each other; and the plurality of radiation parts in each radiation structure comprise at least a first radiation part and a second radiation part; one first microstrip line is configured to feed power to the radiation elements in one first radiation part, one second microstrip line is configured to feed power to the radiation elements in one second radiation part, and the first microstrip line has a feed direction different from that of the second microstrip line.

20. The method according to claim 19, wherein the dielectric layer comprises a first sub-dielectric layer, a first bonding layer, a second sub-dielectric layer, a second bonding layer, and a third sub-dielectric layer sequentially disposed in a stack, and the reference electrode layer is formed on a side of the first sub-dielectric layer distal to the first bonding layer, and the radiation structure is formed on a side of the third sub-dielectric layer distal to the second bonding layer; or the reference electrode layer is formed on a side of the first sub-dielectric layer proximal to the first bonding layer and the radiation structure is formed on a side of the third sub-dielectric layer proximal to the second bonding layer.

* * * * *